United States Patent
Wolin et al.

(10) Patent No.: US 6,661,203 B2
(45) Date of Patent: Dec. 9, 2003

(54) BATTERY CHARGING AND DISCHARGING SYSTEM OPTIMIZED FOR HIGH TEMPERATURE ENVIRONMENTS

(75) Inventors: Dale Wolin, Boise, ID (US); Eugene Cohen, Eagle, ID (US); Richard G. Sevier, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 44 days.

(21) Appl. No.: 10/011,140

(22) Filed: Nov. 12, 2001

(65) Prior Publication Data

US 2003/0090238 A1 May 15, 2003

(51) Int. Cl.[7] .................................................. H02J 7/00
(52) U.S. Cl. ....................................... 320/134; 320/128
(58) Field of Search ................................. 320/134, 128, 320/127, 112, 144, 150, 153; 324/426, 427

(56) References Cited

U.S. PATENT DOCUMENTS

| | | | | |
|---|---|---|---|---|
| 5,572,110 A | * | 11/1996 | Dunstan .................... | 320/106 |
| 5,789,899 A | * | 8/1998 | van Phuoc et al. ......... | 320/133 |
| 6,160,377 A | * | 12/2000 | Fujii .......................... | 320/117 |
| 6,271,643 B1 | * | 8/2001 | Becker et al. .............. | 320/112 |
| 6,286,109 B1 | * | 9/2001 | Pirdy ......................... | 713/340 |
| 6,366,056 B1 | * | 4/2002 | Podrazhansky et al. ..... | 320/141 |

* cited by examiner

*Primary Examiner*—Michael Sherry
*Assistant Examiner*—Lawrence Luk

(57) ABSTRACT

A method and apparatus for controlling the charge and discharge currents in a battery (2) as a function of temperature. When a battery (2) is charged or discharged in an environment that approaches its design operating temperature extreme, the currents are reduced to limit self-heating of the battery and thus extend the useful operating environment temperature range. A temperature sensor (18) is coupled to a controller (6) to sense the battery (2) temperature. The temperature information is used to set a suitable charging or discharging current (8).

31 Claims, 2 Drawing Sheets

BATTERY CHARGING AND DISCHARGING SYSTEM OPTIMIZED FOR HIGH TEMPERATURE ENVIRONMENTS

BACKGROUND OF THE INVENTION

1. Field of the Invention

The present invention relates to apparatus and methods for charging rechargeable batteries. More specifically, the present invention relates to apparatus and method for charging, discharging and recharging rechargeable batteries under adverse thermal conditions.

2. Description of the Related Art

Reliable electric power sources are needed to meet the continued growth of electric and electronic business, commercial and personal applications. For portable applications, the chemical storage battery is most commonly employed. For fixed location applications, the public power grid is the most common source of electrical power. Also, alternative sources of power are often employed to produce electric power, such as solar-voltaic, thermal, wind, water and other power sources.

For many applications, a high degree of reliability is required. Although public power grids are highly reliable, these grids are not perfect. Nor are alternative sources of electric power. Therefore, storage batteries are frequently employed in conjunction with, and as a back-up to, the public power grid and alternative sources of electrical power.

Chemical storage batteries have been produced using a variety of technologies. Each technology comprises a number of defining characteristics that should be considered in selecting a suitable technology for a particular application. These include, but are not limited to, size, weight, cost, power density, environmental constraints, voltage, current, power, and so forth.

In many applications, the ability to be recharged is a critical requirement of a chemical storage battery. Rechargeability reduces cost, extends useful life, and adds reliability to both battery and system design. Some common chemical technologies employed in rechargeable batteries are Nickel-Metal Hydride, Lithium Ion, Lithium Ion Polymer, Lead-Acid, and Nickel Cadmium among other unique and hybrid technologies.

Rechargeable batteries are charged by delivering electric current to positive and negative terminals of the battery for a duration of time sufficient to fully charge the battery. Later, current is drawn from the battery as a power source to some particular device or application.

However, the conditions of charging and discharging are not without limitations. The limitations are typically defined by the battery manufacturer or supplier. In applications where a battery is maintained as a back up to another primary source of electrical power, the battery may rest for long periods of time in a fully charged ("standby") state, awaiting an interruption of the primary power source. When this occurs, the electric power stored in the battery is consumed in lieu of the primary power source.

A chemical battery resting in the standby state for long periods of time may degrade due to various factors. The total power available may be reduced, the terminal voltage may change, and the ability to determine the amount of power available may be compromised.

Smart battery charge algorithms have been developed to alleviate some of the problems associated with long term standby operation of a battery. Such chargers periodically 'condition' the battery by applying an artificial load to discharge the battery to some predetermined level, and then recharge the battery to full charge. During such a conditioning process, certain metrics may be measured and used to calibrate the battery for later determination of the available power during a battery discharge cycle. It is desirable to process a discharge cycle in as short a period of time as possible so that the battery can quickly be returned to standby operation. Similarly, it is generally desirable to charge a battery as quickly as possible so that it can be readied for use as quickly as possible.

When a battery is being charged or discharged, a certain amount of internal heat is generated as current flows through the battery. This heat is proportional to the amount of current flowing within the battery. In ambient conditions where the amount of heat generated is small compared to the heat loss from the battery, the internal heat generation is usually not significant. Often, a battery is located in close physical proximity to the device it powers or to which it provides standby service. An example of this is occurs when a battery is used to provide standby power to a computing device. In most instances, the device with which the battery operates also generates heat during operation.

Electrical energy discharged from the battery can cause thermal problems at high temperature, for both the battery and the adjacent circuitry. For example, a battery may be subjected to heat energy produced by the device it powers as well as the heat the battery produces internally. In addition, the components adjacent to the battery conditioning circuit (often a resistive load) may be pushed close to thermal limits due to joule heating of the discharge load at high temperature.

In addition, other heat sources in the vicinity of the battery may affect ambient conditions and raise the operating temperature of the environment. Thus, it is not uncommon for a battery to be operated at substantially elevated temperatures.

When a battery is operating at or near its maximum operating temperature, designers are faced with a dilemma. If the battery charge and discharge currents are maintained at levels normally applied for the lower ranges of expected operating temperatures, the battery life and reliability can be greatly compromised when temperatures become elevated. On the other hand, if the designer takes a conservative approach, and sets the charge and discharge currents at levels consistent with a reasonable maximum operating temperature, then charge and discharge currents may be so low that the time required to accomplish these operations become unacceptably long.

Alternatives presently available to address this dilemma include locating the battery in a cooler environment, usually distant from the device being powered and providing additional cooling equipment. Each of these alternatives is typically undesirable due to increased cost, greater systems complexity, or reduced reliability, inter alia.

Thus there is a need in the art for an apparatus and method for efficiently charging, discharging and recharging batteries in environments with variable thermal conditions.

SUMMARY OF THE INVENTION

The need in the art is addressed by the apparatus and methods taught by the present invention. An apparatus for charging a battery according to its temperature is taught. The apparatus includes a charging circuit adapted to charge a battery and a temperature sensor positioned to sense a battery temperature, i.e., adjacent environmental temperature. The apparatus includes a controller coupled to the temperature sensor and the charging circuit. The controller operates to set the charging current in accordance with the sensed temperature.

In a refinement, the controller continuously sets the charging current in accordance with the sensed temperature. In a further refinement, the controller periodically sets the charging current in accordance the sensed temperature. In a further refinement, the apparatus further includes a memory coupled to the controller having a temperature and charging current look up table stored therein. In this embodiment, the controller accesses the look up table to set the charging current. In a further refinement, the controller operates to set the charging current to a maximum value when the temperature is lower than a first predetermined threshold value. In a further refinement, the maximum value is the battery's maximum specified charging current and the first predetermined threshold value is the battery's maximum charging temperature. In a further refinement, the controller sets the charging current to zero when the temperature is higher than a second predetermined threshold value. In a further refinement, the battery is coupled to a load and the temperature sensor senses the temperature of the battery and the load.

The present invention also teaches an apparatus for exercising or conditioning a battery. This apparatus includes the charging circuit and a temperature sensor. Also, a discharging circuit is coupled to the battery while a controller is coupled to the temperature sensor, the charging circuit, and the discharging circuit. The controller operates to set the charging and discharging currents in accordance with temperature.

DESCRIPTION OF THE INVENTION

Figure 1:
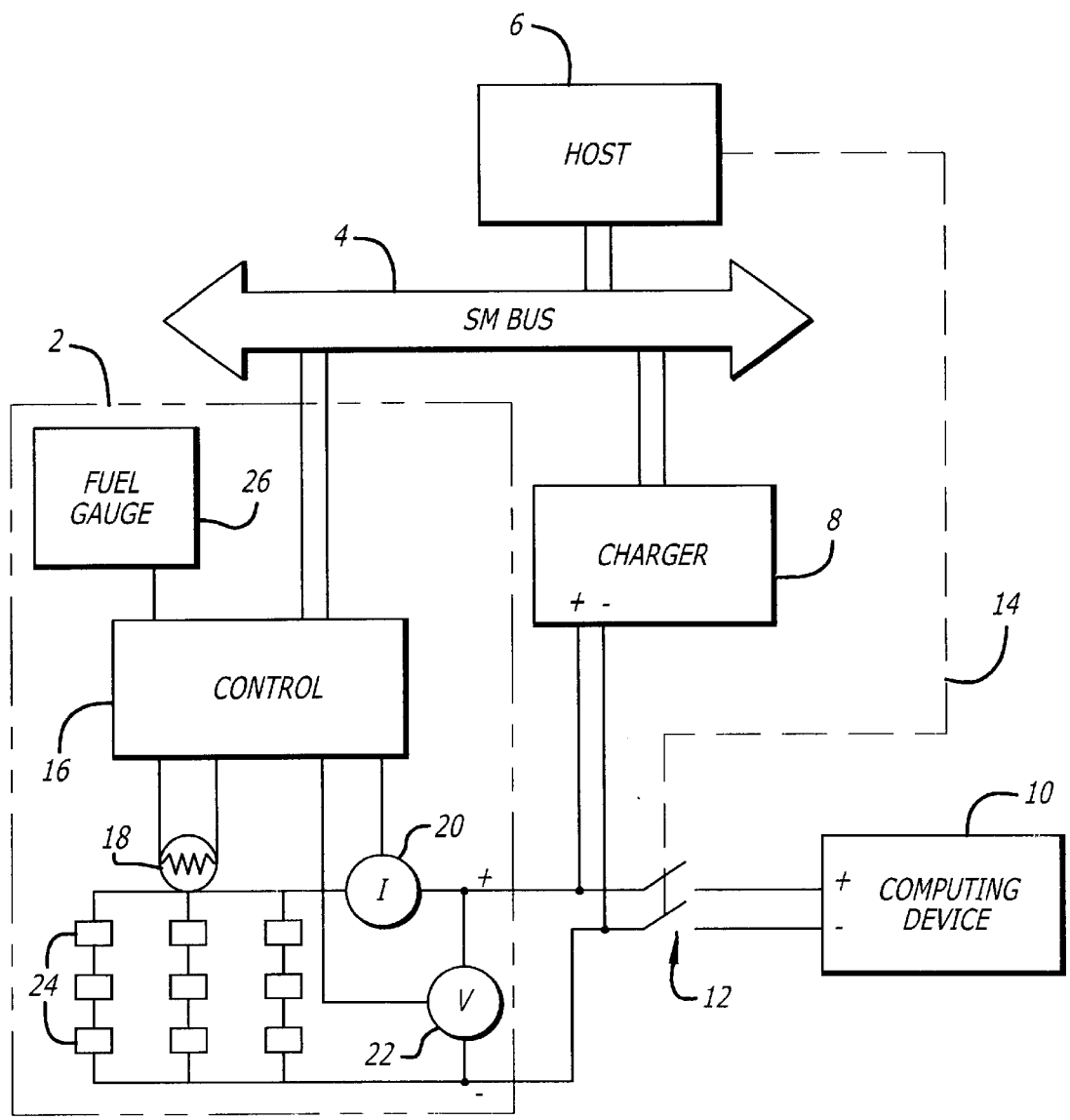
FIG. 1 is a functional block diagram of an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention advantageously utilizes a temperature sensor in combination with a battery charger, or a battery conditioner, to control charging and discharging current flow as a function of the battery temperature. As is understood by those skilled in the art, rechargeable batteries are characterized by a number of operational constraints. Among these are terminal and charging voltage, maximum charging current flow, maximum current draw, and a range of environmental constraints, including maximum operation, charging and discharging temperatures. Implementation of a battery in a system that operates outside the bounds of such constraints will lead to a number of deleterious effects. These include reduced battery life, reduced battery capacity, and certain potentials for dangerous situations including overheating, fire, and chemical leakage. Thus, designers strive to maintain operational factors within design constraints. Yet, in certain practical applications, designers are forced to implement batteries in environments that push the limits of these constraints. The present invention allows designers to move closer to the absolute limits, while still maintaining maximum performance from the battery and the system into which it is installed.

As discussed above, a number of chemical technologies are employed in modern rechargeable batteries. Each technology is constrained as noted above. In an illustrative embodiment, a lithium ion battery is employed. Nonetheless, it will be understood by those of ordinary skill in the art that the teachings provided herein are not limited to a particular battery technology.

When a battery is charged or discharged, current flows through the battery and a certain amount of internal heat is produced. When the battery is being charged or discharged in an environment near its maximum operating temperature, the internal heat generated can push the battery beyond it design constraints, leading to the aforementioned deleterious effects. Operating environments that are near a battery's operating extremes are rather common. For example, a battery back-up system for a computing device, such as a computer or mass storage system, is often times located in close proximity to the computing device. The heat produced by the computing device contributes to the heat of the environment that the battery operates within. Also ambient conditions may be warm or hot, exacerbating the thermal environment. There are many other applications that push the thermal constraints, including outdoor, mobile, industrial, non-air conditioned, and other similar environments. The present invention advantageously balances the current flow in the battery, thus balancing the internal heat generation and build-up, with the battery and local environmental temperature.

In an illustrative embodiment, a lithium ion smart battery is employed in a computer storage disk array system and the present invention is implemented to allow the system to extract maximum performance from the battery without exceeding safe operational constraints for the battery.

The Smart Battery industry standard describes one or more battery cells in conjunction with a controlling device that enables the battery to measure and communicate certain information about its operation to a user or an external device. An implementation of a Smart Battery, which is the battery employed in an illustrative embodiment of the present invention, is the Moltech Power Systems model NI2040A17 Rechargeable Lithium Ion Battery, specifications for which are available from Moltech Power Systems, Inc., 12801 NW Highway 441, Alachua, Fla. 32615. This Smart Battery employs lithium ion chemistry in nine storage cells that are arranged in a three by three series-parallel configuration to yield a nominal terminal voltage of 10.8 volts and a power rating of 5000 milli-Ampere hours ("mAhr"). The Smart Battery employs a controller and a "fuel gauge" which is coupled to a display that indicates the battery's power reserve in twenty percent increments. The Smart Battery comprises a thermistor temperature sensor within its housing. The Smart Battery also comprises an SMBus two-wire serial communications port, as is understood by those possessing ordinary skill in the art. The SMBus interface generally applies the industry standard $I^2C$ signaling levels. The SMbus is operable to communicate the smart battery's terminal voltage, the rate of current flow into or out of the battery, the charges state, including whether the battery is fully charged or fully discharged, and the temperature of the battery, according to the aforementioned thermistor temperature sensor. In the illustrative embodiment, the SMBus is coupled to a host controller, as will be more fully discussed herein after. The illustrative embodiment Smart Battery specifications provide a maximum charge current to 3 amperes at 12.6 volts in the range of temperatures from 0° C. to 45° C. Discharge is rated at 3 amperes from 0° C. to 50° C. Full charge is realized when the charging current drops below 150 milli-amperes.

Reference is directed to FIG. 1, which is a functional block diagram of an illustrative embodiment of the present invention. The aforementioned Smart Battery 2 comprises a plurality of lithium ion cells 24 that are arranged in a series-parallel configuration. A thermistor 18 is located within the battery 2 at a position enabling it to sense the temperature immediately adjacent to the battery cells 24. The thermistor 18 is coupled to a controller 16, which is operable to read the temperature via the thermistor 18. The controller 16 is coupled to a current sensor 20 that enables the controller 16 to monitor the current flow through the battery 2. The controller 16 is also coupled to a voltage sensor 22 that enables the controller 16 to monitor the battery 2 terminal voltage. A fuel gauge 26 is provided that displays the remaining battery capacity, as well as making this information available to the controller 16.

The battery 2 controller 16 is coupled to an SMBus 4 enabling communications of the aforementioned parameters through the SMBus 4. The positive and negative output terminals of battery 2 are coupled though relay 12 to a load, which is a computing device 10 in this illustrative embodiment. A programmable charger 8 is coupled to the battery 2 and enables the supply of charging current to the battery 2. The charger 8 comprises an SMBus interface coupled to SMBus 4, which interface allows the charger 8 to be programmed to deliver a specified current and voltage to the battery 2 for charging thereof. A host controller 6 is coupled to the SMBus 4 and is operable to control the operation of this embodiment of the present invention. The host controller 6 is also coupled 14 to actuate relay 12, which may be accomplished either directly (as shown) or through an SMBus interface (not shown). The host controller 6 may be any of a variety of processors, microprocessors, controllers, microcontrollers, or other programmable devices as are presently understood, or later become available, to those possessing ordinary skill in the art. The host controller includes an amount of random access memory in the illustrative embodiment. The temperature sensor may be a thermistor, a thermocouple, an infrared sensor, or any other sensor having an output proportional to temperature that is understood by those possessing ordinary skill in the art.

The host controller 6 memory is programmed with a look up table of charging and discharging currents related to temperatures. In the illustrative embodiment, these relations are determined through empirical measurements. Table 1 below shows illustrative charging current and temperature values:

TABLE 1

| Temperature | Current |
| --- | --- |
| Less than 45° C. | 2.0 Amps |
| 45° C. to 55° C. | 1.0 Amps |
| 55° C. to 60° C. | 0.5 Amps |
| Greater then 60° C. | 0.0 Amps |

In operation, the host controller 16 periodically requests the battery temperature from the smart battery 2 and uses this value to access the memory look up table to select a charging current associated with that temperature. By applying these reduced current values, a corresponding reduction in the self-heating of the battery cells is caused by the current flow. This reduction allows the battery to function in a correspondingly warmer environment at the system level. For example, a reduction of the charge current by 50% will reduce the power, and hence the self-heating term, by the square of the charge, or 75%. This readily provides an improvement of 5° C. compared to the battery suppliers recommend extreme temperatures of operation.

As may be expected with respect to the charging cycle, a self-heating term is associated with cell temperatures due to the discharging cycle. When a battery is conditioned, or exercised, the system discharges the battery to a predetermined level. This allows the system to calibrate the battery and assess capacity and useful life, as is understood by those skilled in the art. The battery is then recharged, as discussed above. The discharge rate is reduced in like fashion to the charge rate, thus reducing self-heating and extending the battery's useful life. Also note that the discharge current is directed to a load, such as a resistive load, that converts the battery energy into heat as it is discharged. In the illustrative embodiment, a variable impedance load, under control of the host controller, is employed. A look up table in the memory is used to recall empirically derived factors for suitable discharge current rates, in like fashion with respect to the charging approach. The load is typically located in close proximity to the battery and thus the heat produced affects the battery's environment. The temperature sensor should be positioned to detect this heat, thereby allowing the system to respond accordingly.

Figure 2:
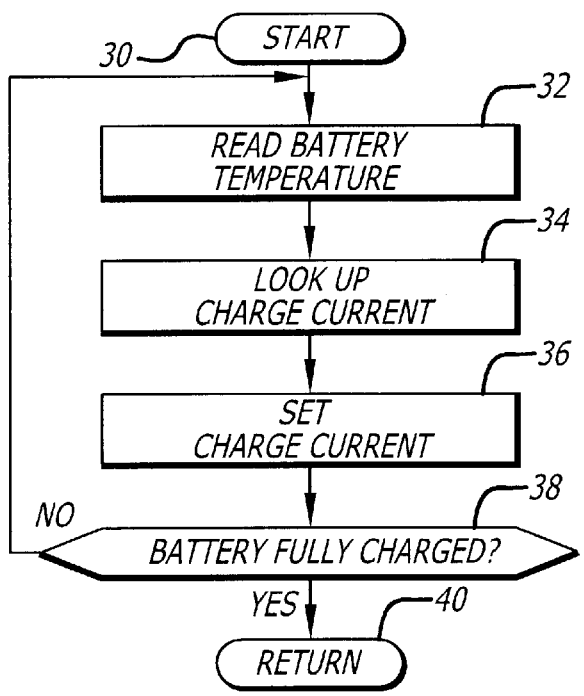
FIG. 2 is a flow diagram of an illustrative embodiment of the present invention.

Reference is directed to FIG. 2, which is a flow diagram of an illustrative embodiment of a charging operation according to the present invention. The process is called by the host controller at step 30 and proceeds to read the battery temperature at step 32. The battery temperature returned is used to access the look up table in the memory at step 34. The current associated with that temperature is recalled and used to set the output current of the charger at step 36. At step 38, the host controller reads the charge state over the SMBus to determine whether the battery is fully charged or not. If the battery is fully charged at step 38, then the process returns to the calling routine at step 40. On the other hand, if the battery is not fully charged at step 38, then the flow returns to step 32 to repeat the process.

The foregoing describes an operation where the battery temperature is effectively continuously tested by the reiterative loop. In a practical application, it may be preferred to add a fixed time delay because the thermal mass of the battery will prevent sudden jumps in temperature. Thus, the process can readily be adapted from a continuous test to a periodic test, suitable for a given application and environment.

Figure 3:
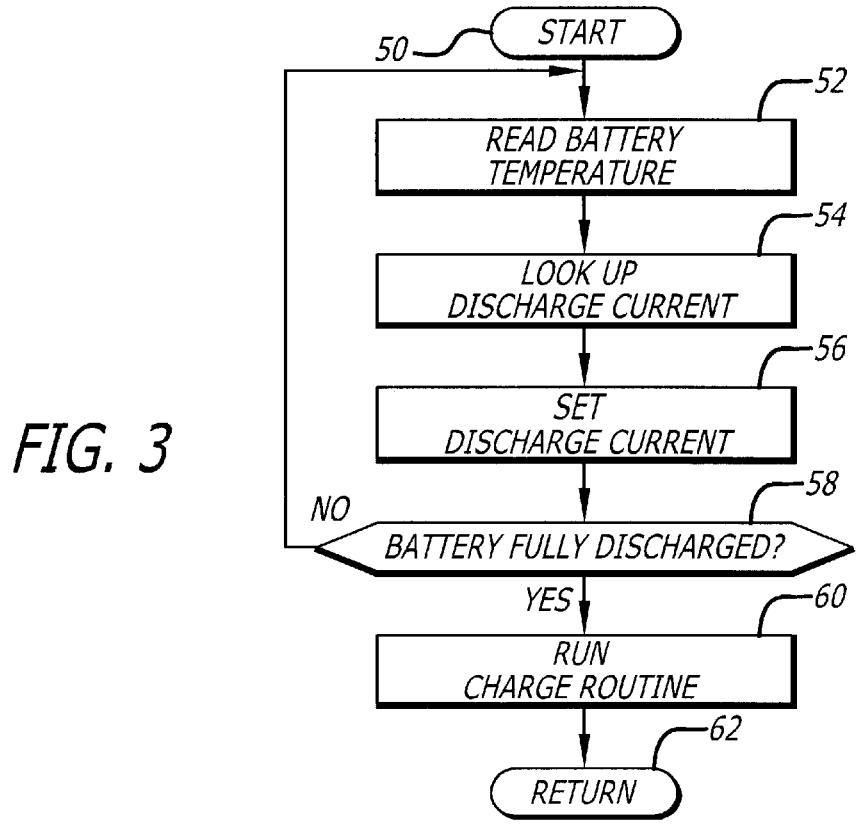
FIG. 3 is a flow diagram of an illustrative embodiment of the present invention.

Reference is directed to FIG. 3, which is a flow diagram of an illustrative embodiment of the conditioning, or exercise, operation taught by the present invention. The process is called by the host controller at step 50 and proceeds to read the battery temperature at step 52. The battery temperature returned is used to access the look up table in the memory at step 54. The discharge current associated with that temperature is recalled and used to set the load impedance, or discharge current at step 56. At step 58, the host controller reads the charge state over the SMBus to determine whether the battery is fully discharged or not. If the battery is fully discharged at step 58, then the process proceeds to step 60 where the charging process of FIG. 2 is executed. After the charging process is completed, flow returns to the calling routine at step 62 in FIG. 3.

On the other hand, if the battery is not fully discharged at step 58 in FIG. 2, then the flow returns to step 52 to repeat the process. The foregoing describes an operation where the battery temperature is effectively continuously tested by the reiterative loop. In a practical application, it may be preferred to add a fixed time delay because the thermal mass of the battery will prevent sudden jumps in temperature. Thus, the process can readily be adapted from a continuous test to a periodic test, suitable for the application and environment at hand.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

What is claimed is:

1. An apparatus for charging a battery comprising
   a charging circuit for providing a charging current to the battery;
   a temperature sensor positioned to sense a temperature of said battery; and
   a controller coupled to said temperature sensor and said charging circuit and operable to control said charging circuit in accordance with said temperature, said controller operable to set said charging current to zero when said temperature is higher than a first predetermined threshold value.

2. The apparatus of claim 1 wherein said controller continuously sets said charging current in accordance with said temperature.

3. The apparatus of claim 1 wherein said controller periodically sets said charging current in accordance with said temperature.

4. The apparatus of claim 1 further comprising a memory coupled to said controller having a temperature and charging current look up table stored therein, and wherein said controller accesses said look up table to set said charging current.

5. The apparatus of claim 1 wherein said controller is operable to set said charging current to a maximum value when said temperature is lower than a second predetermined threshold value.

6. The apparatus of claim 5 wherein said maximum value is the battery's maximum specified charging current, and said second predetermined threshold value is the battery's maximum charging temperature.

7. The apparatus of claim 1 wherein the battery is coupled to a load, and wherein said temperature sensor senses that temperature of the battery and the load.

8. An apparatus for exercising a battery, comprising
   a charging circuit having a charging current output coupled to the battery;
   a temperature sensor positioned to sense a temperature related to the battery temperature;
   a discharging circuit having a discharging current input coupled to the battery; and
   a controller coupled to said temperature sensor, said charging circuit, and said discharging circuit, said controller operable to set said charging current in accordance with said temperature, and operable to set said discharging current in accordance with said temperature, said controller being operable to set said discharging current to zero when said temperature is higher than a first predetermined threshold value.

9. The apparatus of claim 8 and wherein said controller continuously sets said discharging current in accordance with said temperature.

10. The apparatus of claim 8 and wherein said controller periodically sets said discharging current in accordance with said temperature.

11. The apparatus of claim 8 further comprising a memory coupled to said controller having a temperature versus discharging current look up table stored therein, and wherein said controller accesses said look up table to set said discharging current.

12. The apparatus of claim 11 and wherein said discharging circuit comprises a variable impedance load and wherein said look up table values correspond to values of said variable impedance load.

13. The apparatus of claim 8 and wherein said controller is operable to set said discharging current to a maximum value when said temperature is lower than a second predetermined threshold value.

14. The apparatus of claim 8 wherein said maximum value is the battery's maximum specified discharging current and said second predetermined threshold value is the battery's maximum discharging temperature.

15. The apparatus of claim 8 wherein said temperature sensor senses the temperature of the battery and said discharging circuit.

16. A method of charging a battery, comprising the steps of:
   sensing a temperature related to the battery temperature;
   setting a charging current in accordance with said sensed temperature and setting said charging current to zero when said temperature is higher than a first predetermined threshold value; and
   charging the battery at said charging current.

17. The method of claim 16 and wherein said sensing and setting steps are repeated continuously during said charging step.

18. The method of claim 16 and wherein said sensing and setting steps are repeated periodically during said charging step.

19. The method of claim 16 and wherein said setting step further comprises the step of recalling a charging current corresponding to said sensed temperature from a look up table.

20. The method of claim 16 and wherein set setting step includes setting said charging current to a maximum value if said temperature is lower than a second predetermined threshold.

21. The method of claim 20 and wherein said maximum value is the battery's maximum specified charging current, and said second predetermined threshold is the battery's maximum charging temperature.

22. The method of claim 16 wherein the battery is coupled to a load, and wherein said sensing step includes sensing the temperature of the battery and the load.

23. A method of exercising a battery, comprising the steps of:
   sensing a temperature related to the battery temperature;
   setting a discharging current in accordance with said temperature;
   discharging the battery at said discharging current;
   discontinuing said discharging step when a predetermined battery voltage is reached;
   setting a charging current in accordance with said temperature, said setting step further including the step of setting said discharging current to zero when said temperature is higher than a first predetermined threshold value; and
   charging the battery at said charging current.

24. The method of claim 23 and wherein said sensing and setting a discharge current steps are repeated continuously during said discharging step.

25. The method of claim 23 and wherein said sensing and setting a discharge current steps are repeated periodically during said discharging step.

26. The method of claim 23 and wherein said setting step further comprises the step of recalling a discharging current corresponding to said sensed temperature from a look up table.

27. The method of claim 23 and wherein said setting step includes setting said discharging current to a maximum value if said temperature is lower than a second predetermined threshold.

28. The method of claim 27 and wherein said maximum value is the battery's maximum specified discharging current, and said second predetermined threshold is the battery's maximum discharging temperature.

29. The method of claim 23 wherein the battery is coupled to a load, and wherein said sensing step includes sensing the temperature of the battery and the load.

30. An apparatus for exercising a battery, comprising
   a charging circuit having a charging current output coupled to the battery;
   a temperature sensor positioned to sense a temperature related to the battery temperature;
   a discharging circuit having a discharging current input coupled to the battery; and
   a controller coupled to said temperature sensor, said charging circuit, and said discharging circuit, said controller operable to set said charging current in accordance with said temperature, and operable to set said discharging current in accordance with said temperature, said controller being operable to set said discharging current to a maximum value when said temperature is lower than a first predetermined threshold value, said maximum value being the battery's maximum specified discharging current, and said first predetermined threshold value being the battery's maximum discharging temperature.

31. A method of exercising a battery, comprising the steps of:
   sensing a temperature related to the battery temperature;
   setting a discharging current in accordance with said temperature;
   discharging the battery at said discharging current;
   discontinuing said discharging step when a predetermined battery voltage is reached;
   setting a charging current in accordance with said temperature, said setting step further including the step of setting said discharging current to a maximum value if said temperature is lower than a first predetermined thresholds said maximum value being the battery's maximum specified discharging current and said first predetermined threshold value being the battery's maximum discharging temperature; and
   charging the battery at said charging current.

* * * * *